US009097296B2

(12) United States Patent
Li et al.

(10) Patent No.: US 9,097,296 B2
(45) Date of Patent: *Aug. 4, 2015

(54) SEALED ONE WAY ROLLER CLUTCH

(75) Inventors: Jianwen Li, Vaughan (CA); Sean Steele, Mississauga (CA); Richard D. Muizelaar, Mississauga (CA)

(73) Assignee: MagnaPowertrain, Inc., Concord, Ontario (CA)

( * ) Notice: Subject to any disclaimer, the term of this patent is extended or adjusted under 35 U.S.C. 154(b) by 599 days.

This patent is subject to a terminal disclaimer.

(21) Appl. No.: 13/119,105

(22) PCT Filed: Sep. 15, 2009

(86) PCT No.: PCT/CA2009/001289
§ 371 (c)(1),
(2), (4) Date: Mar. 15, 2011

(87) PCT Pub. No.: WO2010/028512
PCT Pub. Date: Mar. 18, 2010

(65) Prior Publication Data
US 2011/0162933 A1  Jul. 7, 2011

Related U.S. Application Data

(60) Provisional application No. 61/096,935, filed on Sep. 15, 2008.

(51) Int. Cl.
*F16D 41/067* (2006.01)
*F16D 13/74* (2006.01)

(52) U.S. Cl.
CPC .............. *F16D 41/067* (2013.01); *F16D 13/74* (2013.01); *F16D 2300/06* (2013.01); *F16D 2300/08* (2013.01)

(58) Field of Classification Search
USPC .............. 192/45.006, 45.008, 45.01, 45.015, 192/45.016, 45.019, 113.32
See application file for complete search history.

(56) References Cited

U.S. PATENT DOCUMENTS

| 1,515,247 A | 11/1924 | Forsyth |
| 2,355,805 A | 8/1944 | Koepp |
| 3,241,641 A | 3/1966 | Cowles |
| 3,732,956 A | 5/1973 | Johnson et al. |
| 4,036,338 A | 7/1977 | Linn et al. |
| 4,178,805 A | 12/1979 | Mazzorana |
| 4,776,237 A | 10/1988 | Premiski et al. |
| 4,782,928 A | 11/1988 | Lederman |

(Continued)

FOREIGN PATENT DOCUMENTS

| EP | 0176767 A1 | 4/1986 |
| EP | 1284213 A2 | 2/2003 |

(Continued)

*Primary Examiner* — Ramya Burgess
*Assistant Examiner* — Mark Manley
(74) *Attorney, Agent, or Firm* — Dickinson Wright PLLC

(57) ABSTRACT

A one-way clutch assembly includes an inner race adapted to be fixed for rotation with a first rotatable member, an outer race having circumferentially spaced apart cam surfaces and being adapted to be fixed for rotation with a second rotatable member as well as a plurality of roller elements positioned therebetween. A plurality of circumferentially extending springs cooperate with the cage to align each roller element with the cam surfaces. The springs and cage urge the roller elements away from the inner race. A retaining mechanism captures lubricant in contact with the roller elements.

21 Claims, 14 Drawing Sheets

(56) References Cited

U.S. PATENT DOCUMENTS

| | | | |
|---|---|---|---|
| 4,821,857 A | 4/1989 | Groh | |
| 4,828,086 A | 5/1989 | Lederman | |
| 4,850,462 A | 7/1989 | Lederman | |
| 4,901,831 A * | 2/1990 | Ito et al. | 192/38 |
| 4,987,670 A | 1/1991 | Papania | |
| 5,033,878 A | 7/1991 | Tsuji et al. | |
| 5,042,628 A | 8/1991 | Malecha | |
| 5,052,518 A | 10/1991 | Trommer | |
| 5,099,972 A | 3/1992 | Ouchi | |
| 5,135,085 A | 8/1992 | Kinoshita et al. | |
| 5,279,399 A | 1/1994 | Riggle | |
| 5,279,400 A | 1/1994 | Riggle et al. | |
| 5,441,452 A | 8/1995 | Jackel et al. | |
| 5,474,152 A | 12/1995 | Wilkinson et al. | |
| 5,476,165 A | 12/1995 | Awaji et al. | |
| 5,482,150 A * | 1/1996 | Stark | 192/45.012 |
| 5,636,720 A | 6/1997 | Lederman | |
| 5,667,046 A | 9/1997 | Stanton et al. | |
| 5,671,836 A * | 9/1997 | Shirataki et al. | 192/113.32 |
| 5,908,094 A | 6/1999 | Le-Calve | |
| 5,927,456 A * | 7/1999 | Monahan et al. | 192/38 |
| 5,966,985 A | 10/1999 | Shuto et al. | |
| 6,092,634 A | 7/2000 | Kremer et al. | |
| 6,092,636 A | 7/2000 | Muramatsu | |
| 6,161,668 A | 12/2000 | Le Calve et al. | |
| 6,374,974 B1 | 4/2002 | Wake | |
| 6,401,893 B1 | 6/2002 | Kinoshita | |
| 6,415,489 B1 | 7/2002 | Martins et al. | |
| 6,443,289 B1 | 9/2002 | Sagae et al. | |
| 6,530,464 B2 | 3/2003 | Ogata et al. | |
| 6,705,444 B2 | 3/2004 | Fujiwara et al. | |
| 6,712,188 B2 | 3/2004 | Ando | |
| 6,769,525 B2 | 8/2004 | Pascoe | |
| 6,796,414 B2 | 9/2004 | Hu et al. | |
| 6,814,198 B2 | 11/2004 | Pascoe | |
| 6,837,352 B2 | 1/2005 | Ohishi | |
| 7,143,881 B2 | 12/2006 | Ichihara et al. | |
| 7,322,455 B2 | 1/2008 | Vetter et al. | |
| 7,472,672 B2 | 1/2009 | Asada et al. | |
| 8,240,286 B2 * | 8/2012 | Li et al. | 123/179.25 |
| 2002/0134636 A1 | 9/2002 | Ando | |
| 2003/0000796 A1 * | 1/2003 | Kawai et al. | 192/223.2 |
| 2003/0226732 A1 * | 12/2003 | Kamiya et al. | 192/45.1 |
| 2004/0255890 A1 | 12/2004 | Tsutsumi et al. | |
| 2006/0266611 A1 | 11/2006 | Updyke et al. | |
| 2007/0034030 A1 | 2/2007 | Suzuki et al. | |
| 2007/0074945 A1 * | 4/2007 | Ponson et al. | 192/41 A |
| 2008/0121202 A1 | 5/2008 | Asada et al. | |
| 2008/0163843 A1 | 7/2008 | Sakai et al. | |
| 2008/0223156 A1 | 9/2008 | Suzuki et al. | |
| 2008/0230341 A1 | 9/2008 | Barraud et al. | |

FOREIGN PATENT DOCUMENTS

| | | |
|---|---|---|
| EP | 1293665 A2 | 3/2003 |
| EP | 1908954 A1 | 4/2008 |
| FR | 2906329 | 3/2008 |
| GB | 1230808 | 5/1971 |
| GB | 2073339 A | 10/1981 |
| JP | 57018823 A | 1/1982 |
| JP | 2005-240930 A | 9/2005 |
| JP | 2006118378 | 5/2006 |
| JP | 2008121660 | 5/2008 |
| WO | WO-2007012943 A1 | 2/2007 |
| WO | WO-2007148228 A1 | 12/2007 |

\* cited by examiner

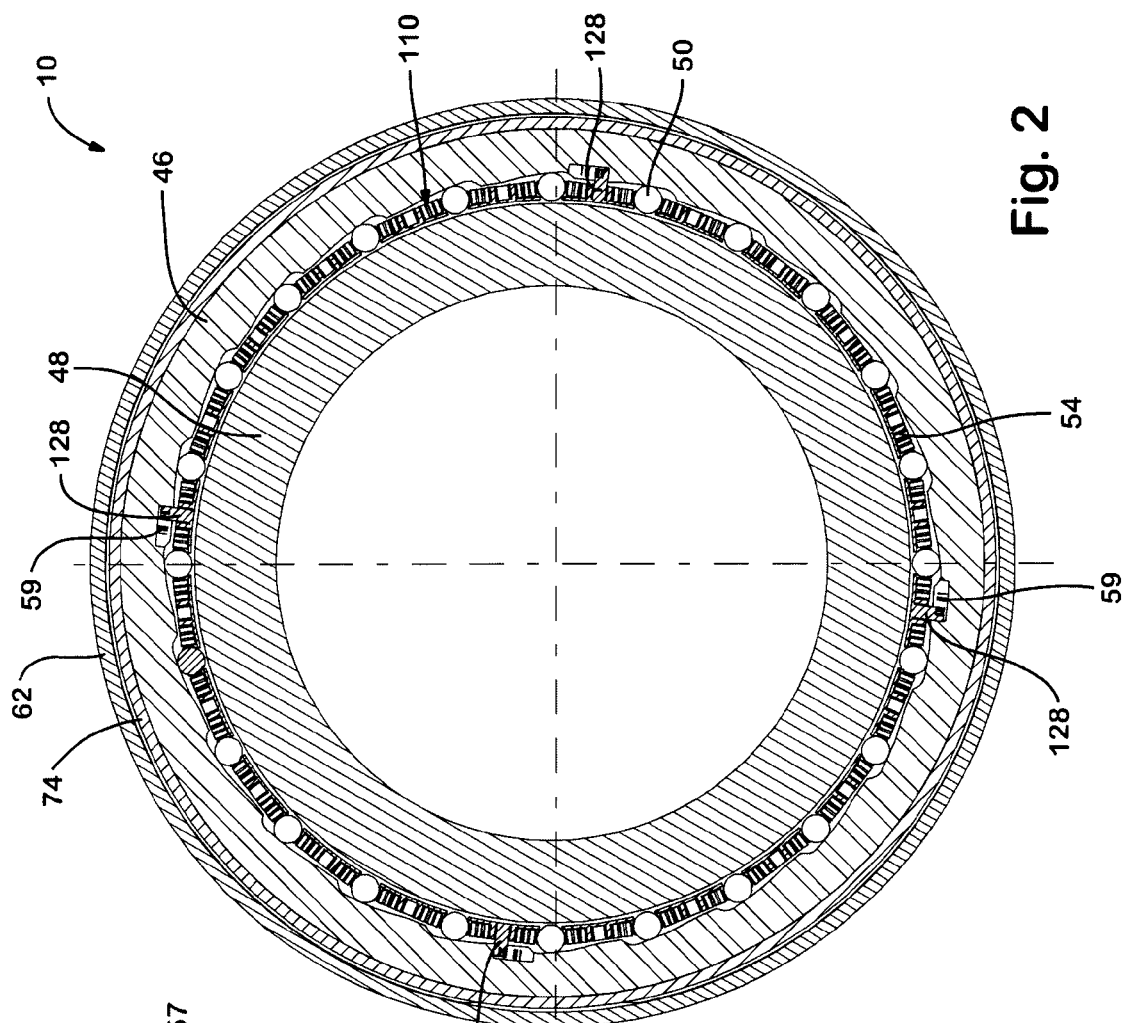
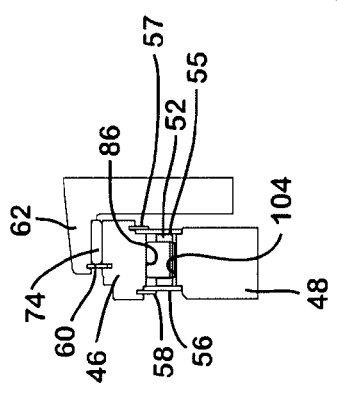
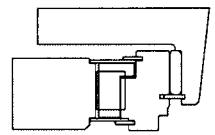
Fig. 2
Fig. 3

SEALED ONE WAY ROLLER CLUTCH

CROSS-REFERENCE TO RELATED APPLICATIONS

This application claims the benefit of U.S. Provisional Application No. 61/096,935 filed on Sep. 15, 2008. The entire disclosure of the above application is incorporated herein by reference.

FIELD

The present disclosure generally relates to an overrunning roller clutch for selectively transferring torque between two rotatable components. More particularly, sealed for life and dry one-way clutches are disclosed.

BACKGROUND

The statements in this section merely provide background information related to the present disclosure and may not constitute prior art.

At least one known clutch associated with an automotive vehicle is positioned immediately adjacent to or partially within an engine block of the internal combustion engine. This positioning is required because lubricant within the engine block is provided to the clutch as well. While such an arrangement may prove to be beneficial, the positioning of the clutch in this system is limited and is not necessarily desirable. Furthermore, additional special machining may be required to the engine block or other internal combustion engine components in order to provide appropriate passageways for the lubricant to reach and return from the clutch.

Other known clutch characteristics such as the generation of heat and a loss of efficiency when operating in an overrunning mode may not lend themselves for use in applications attempting to maximize energy efficiency. Accordingly, it may be desirable to provide an improved one-way clutch that does not require lubrication after initial assembly.

SUMMARY

This section provides a general summary of the disclosure, and is not a comprehensive disclosure of its full scope or all of its features.

A one-way clutch assembly includes an inner race adapted to be fixed for rotation with a first rotatable member, an outer race having circumferentially spaced apart cam surfaces and being adapted to be fixed for rotation with a second rotatable member as well as a plurality of roller elements positioned radially therebetween. A cage aligns each roller element with the cam surfaces. A first seal plate is coupled to one of the inner and outer races and extends over a first end of the roller elements terminating within a recess formed in the other of the inner and outer races. A second seal plate is coupled to one of the inner and outer races and extends over a second opposite end of the roller elements terminating within another recess formed in the other of the inner and outer races. A lubricant is retained in contact with the roller elements by the first and second seal plates.

In another arrangement, a one-way clutch assembly includes an inner race adapted to be fixed for rotation with a first rotatable member, an outer race having circumferentially spaced apart cam surfaces and being adapted to be fixed for rotation with a second rotatable member as well as a plurality of roller elements positioned therebetween. A plurality of circumferentially extending springs cooperate with the cage to align each roller element with the cam surfaces. The springs and cage urge the roller elements away from the inner race. A retaining mechanism captures lubricant in contact with the roller elements.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2 is a plan view of the clutch assembly;

FIG. 3 is a cross-sectional view depicting the one-way clutch assembly;

DETAILED DESCRIPTION

Figure 1:
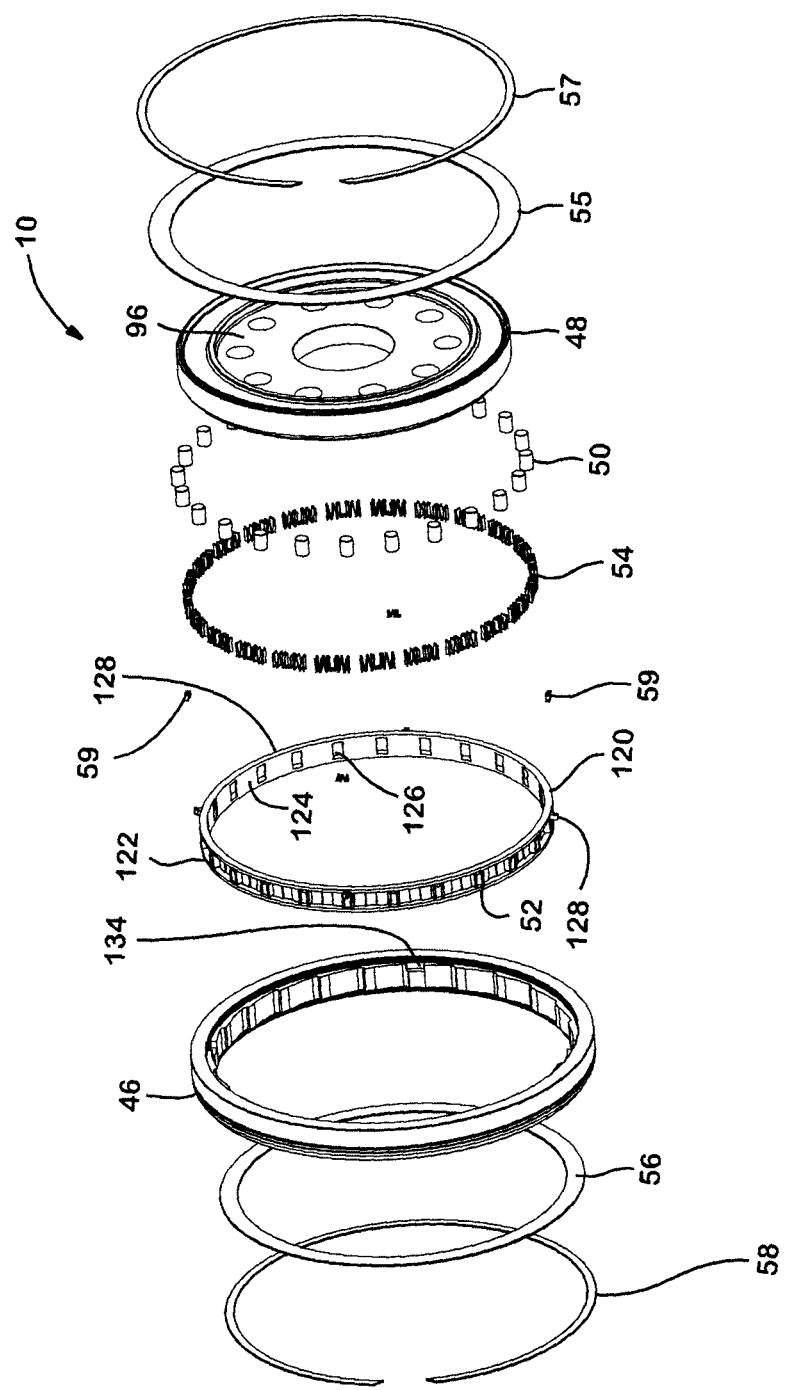
FIG. 1 is an exploded perspective view of a sealed and lubricated for life one-way clutch assembly.
Figure 4:
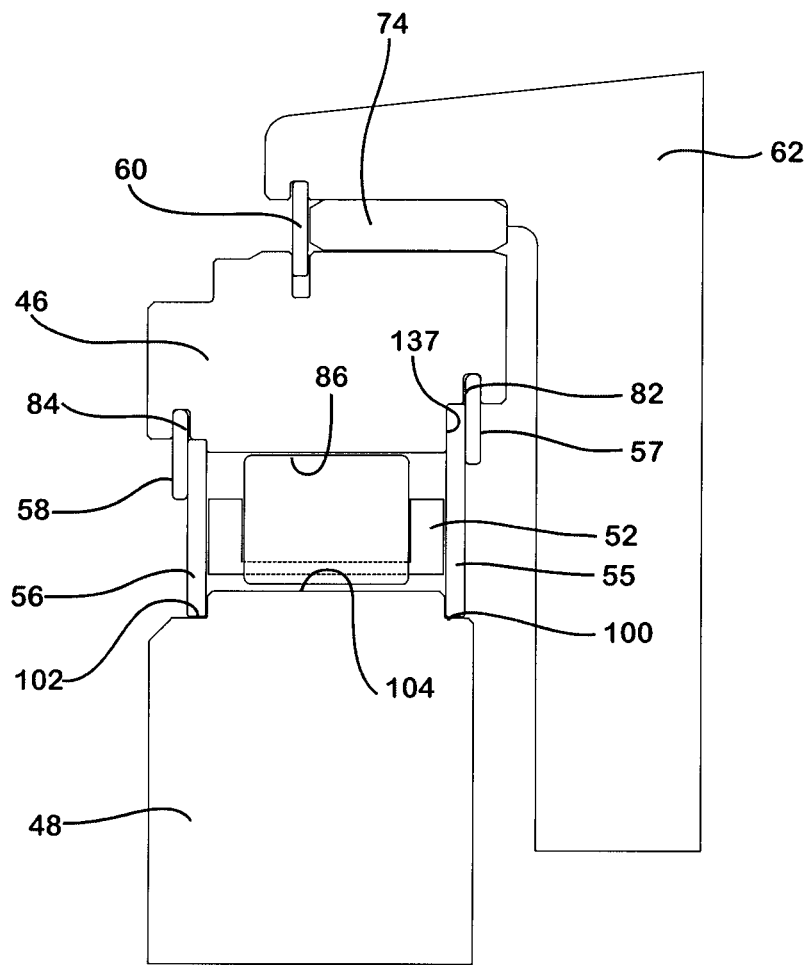
FIG. 4 is a fragmentary sectional view of a portion of the clutch assembly.

The following description is merely exemplary in nature and is not intended to limit the present disclosure, application, or uses. It should be understood that throughout the drawings, corresponding reference numerals indicate like or corresponding parts and features.

FIGS. 1-6 and 9 depict a sealed for life one-way overrunning clutch 10 arranged to selectively transfer torque between rotatable components within a vehicle (not shown). Clutch 10 may be positioned within, adjacent to or spaced apart from any number of powertrain components such as an engine, a transmission, a transfer case, a propeller shaft, a first axle, a rear axle, a differential, an electric motor, or the like.

Clutch 10 includes an outer race 46 adapted to be fixed for rotation with a first rotatable member (not shown), an inner race 48 adapted to be fixed for rotation with a second rotatable member (not shown), a plurality of rollers 50, a cage 52, a plurality of roller springs 54, inner and outer plates 55, 56, inner and outer snap rings 57, 58, a plurality of accordion springs 59 and an ID-OD clip 60. The first rotatable member may be supported for rotation within a housing 62. A bushing 74 may be fixed to housing 62. Outer race 46 may be supported for rotation by bushing 74. ID-OD clip 60 restricts axial movement of outer race 46 relative to housing 62.

An inner diameter of outer race 46 includes an inner ring groove 82, an outer ring groove 84 and a plurality of cam surfaces 86. Each of grooves 82, 84 has a substantially cylindrical shape. Cam surfaces 86 are circumferentially spaced apart from another with each cam surface 86 having a shallow end 92 and a deep end 94 further radially recessed into outer race 46.

Inner race 48 may include a substantially circular cylindrical mounting flange 96 in engagement with the first rotatable member. Alternate methods of coupling inner race 48 to the first rotatable member include welding, a press-fit, a key or any other suitable interconnection. Inner race 48 includes an inner stepped recess 100 and an outer stepped recess 102 positioned on either side of a substantially smooth roller contact surface 104. Each of features 100, 102, 104 include substantially cylindrically-shaped surfaces.

A roller and cage subassembly 110 includes rollers 50, cage 52 and plurality of roller springs 54. Roller and cage subassembly 110 may be subsequently inserted between outer race 46 and inner race 48.

Cage 52 may be a molded plastic component or constructed from metal and may be referred to as skeleton 52. Cage 52 includes a first ring 120 and a second ring 122 spaced apart from one another and interconnected by a series of webs 124 axially extending between first ring 120 and second ring 122. Webs 124 are circumferentially spaced apart from one another a predetermined distance corresponding to a desired position of rollers 50. Webs 124 define a plurality of windows 126 within cage 52 to receive rollers 50 as well as roller springs 54 as will be described. Cage 52 also includes four radially outwardly extending arms 128 having an accordion spring 59 coupled thereto.

To assemble roller and cage subassembly 110, rollers 50 are snapped into place within opposing sets of roller springs 54. Each roller spring 54 includes a guide 130 including bifurcated legs 132 to position one side of each roller 50 at a desired location. At an end opposite of guide 130, roller spring 54 is coupled to cage 52. It should be appreciated that two roller springs 54 cooperate with each other to position a single roller 50.

Figure 5:
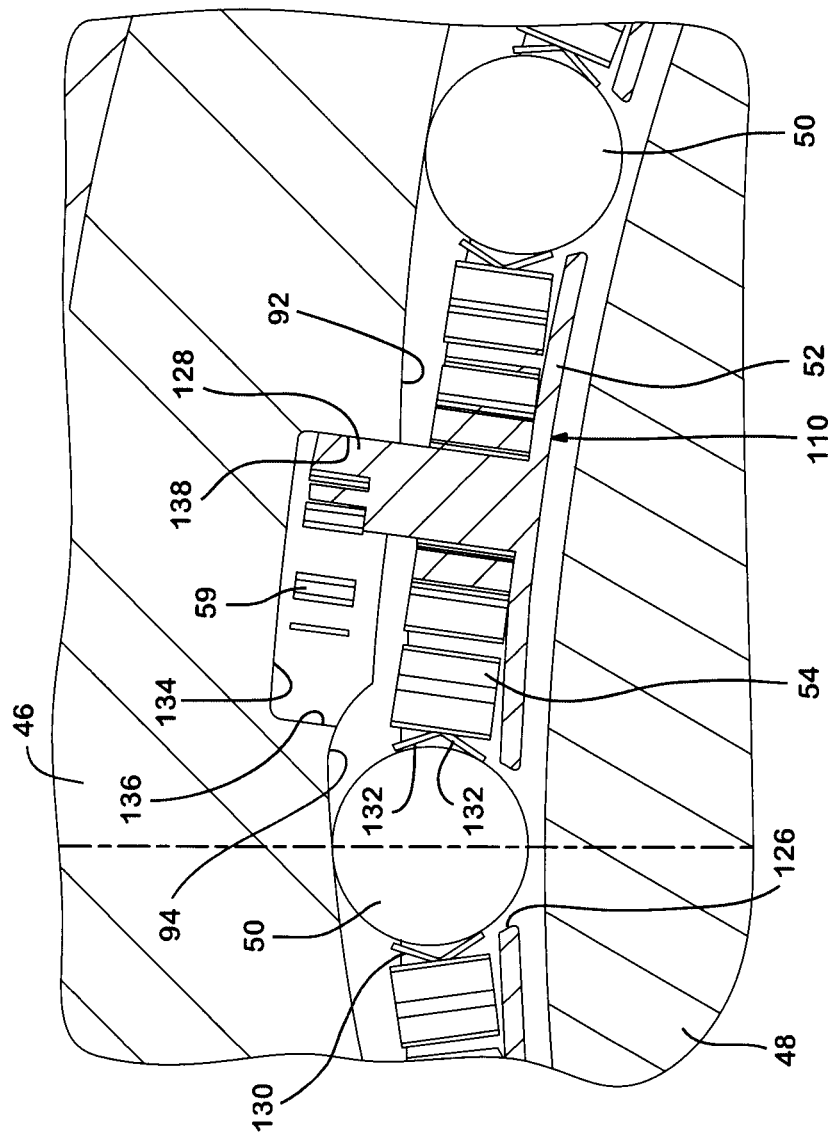
FIG. 5 is a fragmentary sectional view of the clutch assembly in a free-wheeling mode of operation.
Figure 6:
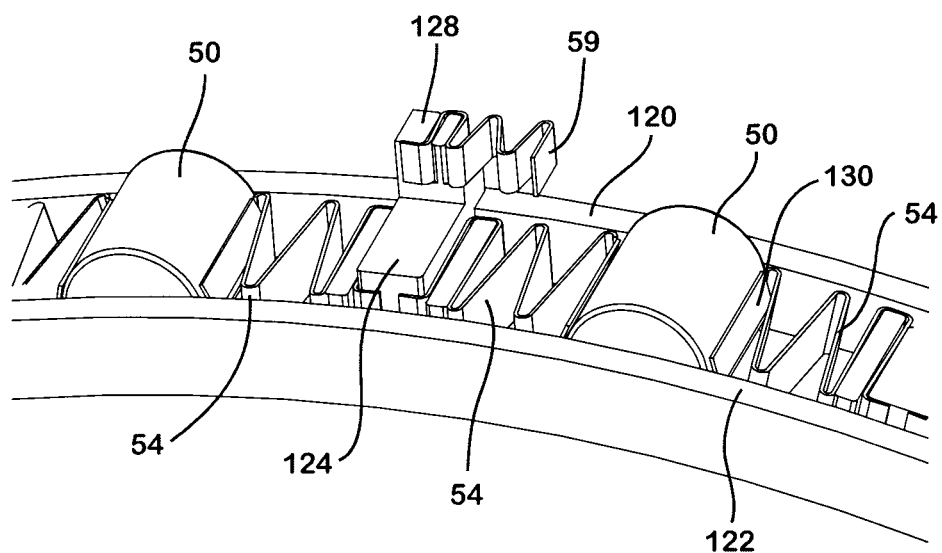
FIG. 6 is a fragmentary perspective view of another portion of the clutch assembly.

Roller and cage subassembly 110 may now be positioned between inner race 48 and outer race 46. As shown in FIGS. 2 and 5, outer race 46 includes four circumferentially spaced apart recesses 134. The terminal ends of arms 128 and accordion springs 59 are positioned within recesses 134. More particularly, one end of accordion spring 59 engages a first sidewall 136 of recess 134. Arm 128 is biased toward a second opposing sidewall 138. When inner race 48 and outer race 46 are at rest, accordion springs 59 rotate cage 52 to engage arms 128 with second sidewalls 138. At this cage position, clutch 10 is in an open or free-wheeling mode where rollers 50 are spaced apart from inner race 48 and are located within deep ends 94. This is also the position of cage 52 when inner race 48 rotates relative to outer race 46 in a first direction.

Once roller and cage subassembly 110 is positioned between outer race 46 and inner race 48, one axial end of clutch 10 may be enclosed by positioning inner seal plate 55 in engagement with a seat 137 positioned adjacent to inner ring groove 82. The thickness of inner seal plate 55, inner ring groove 82, and the position of seat 137 cooperate with one another such that inner seal plate 55 is fixed for rotation with outer race 46. An inner circumferential edge of inner seal plate 55 is positioned proximate to but clear of inner race 48.

A lubricant, such as grease, may be placed in contact with rollers 50, cage 52, roller springs 54 and inner seal plate 55. The lubricated roller and cage subassembly 110 may be enclosed by installing outer seal plate 56 and outer snap ring 58. Outer seal plate 56 is fixed for rotation with outer race 46 in a similar manner to that described in relation to inner seal plate 55. Outer seal plate 56 is positioned in close proximity to but spaced apart from inner race 48 such that frictional losses are minimized and/or eliminated during operation of clutch 10. It is envisioned that clutch 10 need not be lubricated after initial assembly. Accordingly, clutch 10 is a sealed-for-life component. As previously mentioned, ID-OD clip 60 restricts clutch 10 from axial movement relative to housing 62. Furthermore, it should be appreciated that seal plates 55, 56 may alternatively be fixed for rotation with inner race 48 and clear of outer race 46.

Figure 7:
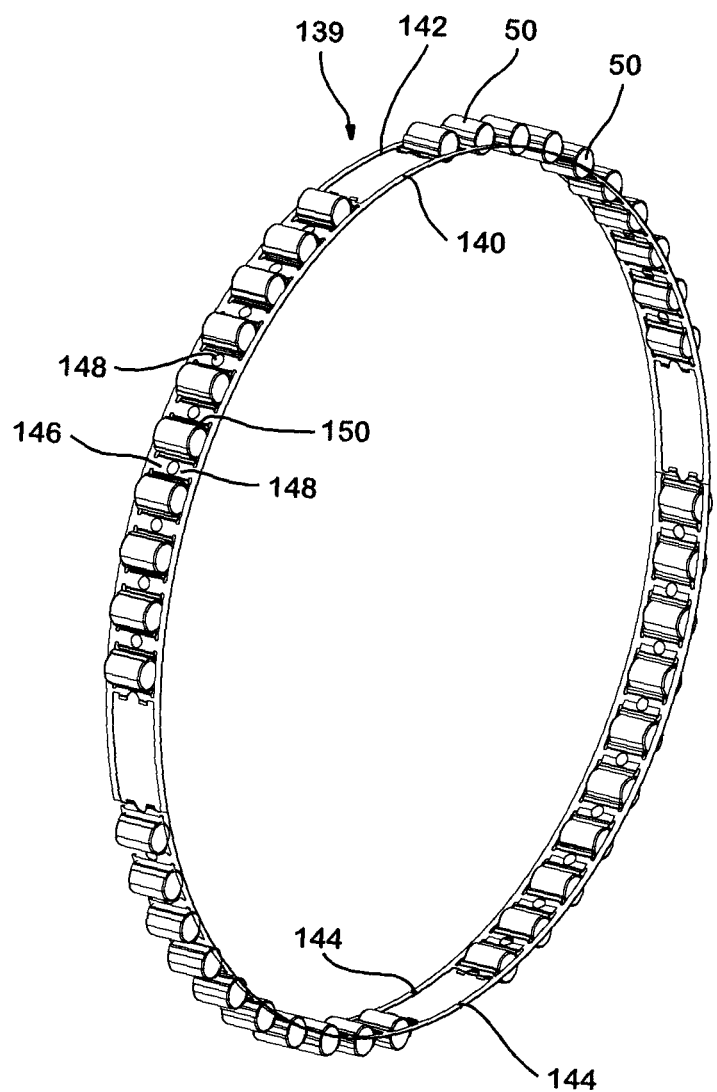
FIG. 7 is a perspective view of a portion of an alternate clutch assembly.
Figure 8:
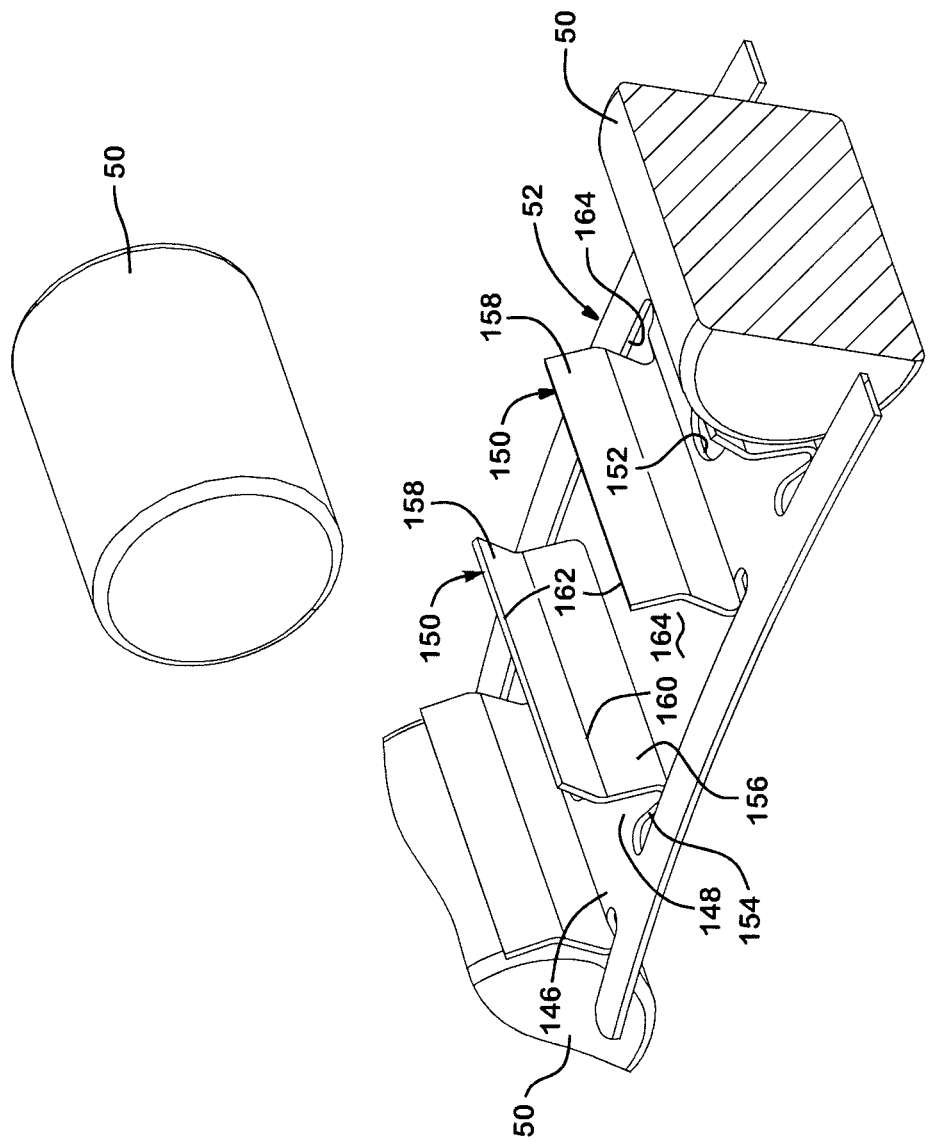
FIG. 8 is a fragmentary exploded perspective view of a portion of the alternate clutch of FIG. 7.
Figure 9:
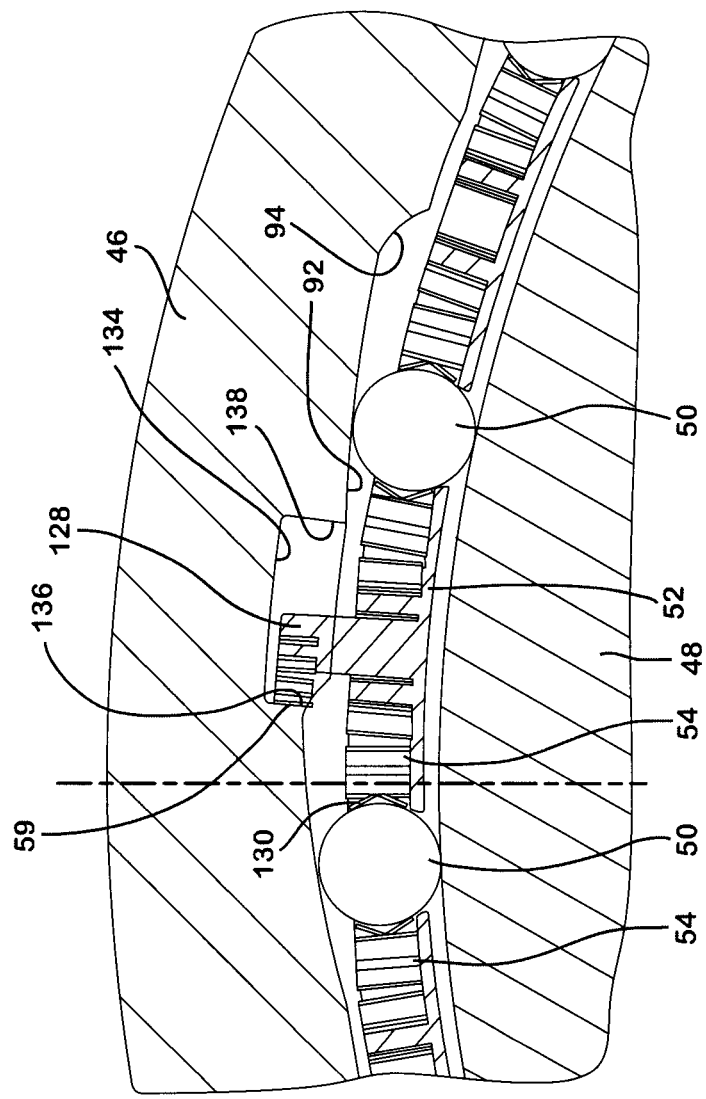
FIG. 9 is a fragmentary sectional view of the clutch assembly of FIG. 5 in a torque transferring mode of operation.

In another arrangement depicted in FIGS. 7 and 8, roller springs 54 may be replaced with a one-piece multi-spring 139 including a first rim 140 and a second rim 142 axially spaced apart from one another. Each of first rim 140 and second rim 142 are shaped as split rings having gaps 144 formed therein, respectively. A plurality of axially extending supports 146 interconnect first rim 140 and second rim 142. Supports 146 are circumferentially spaced apart from one another and each include a base portion 148 and a pair of upturned, radially outwardly extending, guides 150. Preferably, first rim 140, second rim 142 and supports 146 are integrally formed with one another from one piece of spring steel. Each base portion 148 includes an aperture 152 extending therethrough. Apertures 152 cooperate with radially inwardly extending pegs (not shown) formed on certain predetermined webs 124. Each guide 150 includes a foot portion 154 extending from base portion 148, a lower leg portion 156 and an upper leg portion 158. Lower leg portion 156 and upper leg portion 158 are substantially planar segments intersecting one another at an angle greater than 90° but less than 180°. A trough 160 is formed at the intersection of lower leg portion 156 and upper leg portion 158.

Guides 150 are spaced apart from one another such that pairs of upper edges 162 of upper leg portions 158 are spaced apart a distance less than a diameter of roller 50. Pairs of troughs 160 are spaced apart from one another a distance greater than the diameter of rollers 50. Accordingly, each roller 50 is captured within a pocket 164 between guides 150, first rim 140 and second rim 142 and free to rotate therein. Each guide 150 is a resilient member movable from its nominal position shown in the Figures. Because each guide 150 is individually movable, each roller 50 may be simultaneously engaged with contact surface 104 and one of cam surfaces 86 to transfer a maximum quantity of torque through clutch 10. The resiliently movable guides 150 allow a somewhat relaxed tolerancing of the components of clutch 10 while assuring that the full complement of rollers 50 transfer torque when required.

Regardless of which roller spring or multi-spring arrangement is implemented, it may be desirable to transfer torque between the first and second rotatable members when relative rotation in a first direction occurs. Torque is not transferred through clutch 10 when relative rotation in an opposite, second direction occurs. When neither outer race 46 nor inner race 48 are rotating, accordion springs 59 biasedly engage arms 128 to urge rollers 50 toward deep ends 94 of cam surfaces 86, as shown in FIG. 5. Clutch 10 is in the open or free-wheeling mode.

When relative rotation between outer race 46 and inner race 48 occurs in the first direction, rollers 50 are urged toward shallow ends 92 of cam surfaces 86 as shown in FIG.

9. Rollers 50 are wedged between cam surfaces 86 and roller contact surface 104 to transfer torque between outer race 46 and inner race 48. Accordion springs 59 are compressed.

When the relative rotation direction changes to the second direction, cam surfaces 86 no longer urge rollers 50 toward shallow ends 92. Force is provided from accordion springs 59 to rotate cage 52 and move rollers 50 into the position clear of inner race 48. Clutch 10 operates in the free-wheeling mode. Relative rotation between rollers 50 and outer race 46 does not occur and energy losses due to friction are avoided.

Lubricated for life overrunning clutch 10 provides a low cost, energy efficient solution for providing high torque capacity within a small packaging envelope. In the example depicted in the figures, forty rollers are utilized. Each roller is substantially cylindrically shaped having a diameter of approximately 4 to 5 mm. The center-to-center distance between adjacent rollers is approximately 7.5 mm. As such, the gap between each adjacent roller is approximately 2.5 to 3.5 mm or 33 to 50% of the roller diameter. This roller sizing and packing configuration provides a theoretical high torque output. To assure that the actual torque capacity of clutch 10 substantially meets the theoretical torque capacity, roller springs 54 assure that each and every roller 50 transfers torque between outer race 46 and inner race 48 when clutch 10 operates in the locked mode.

Figure 10:
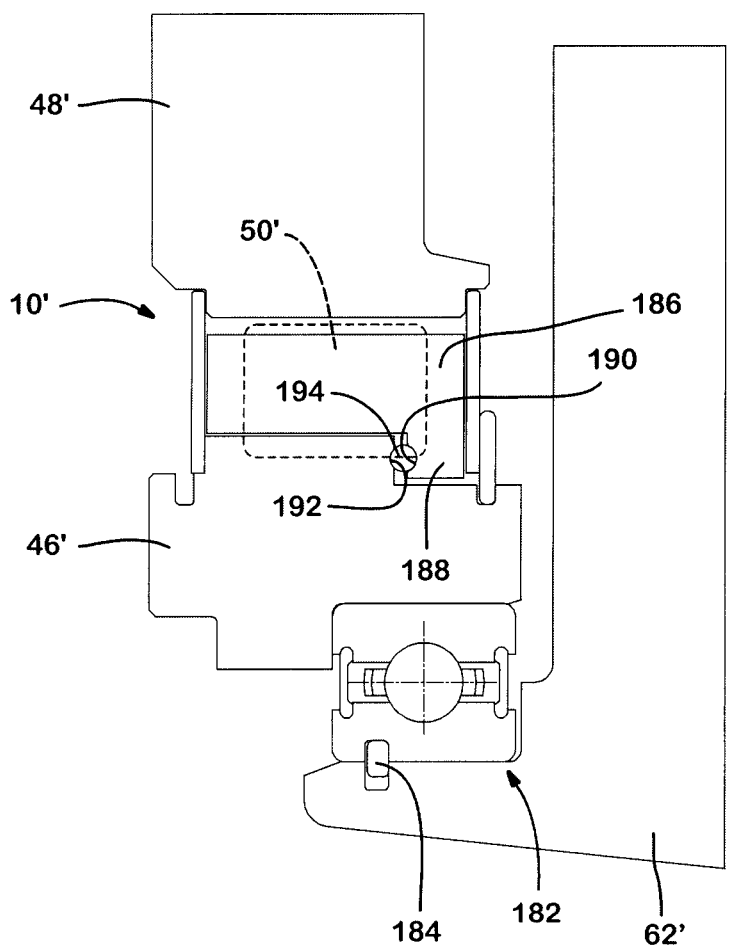
FIG. 10 is a fragmentary cross-sectional view depicting a portion of an alternate one-way clutch.

FIG. 10 depicts another clutch 10'. Clutch 10' is substantially similar to clutch 10 previously described. Accordingly, like elements will retain their previously introduced reference numerals including a prime suffix. To further increase the operational efficiency of clutch 10', bushing 74' has been replaced with a bearing assembly 182. Bearing assembly 182 accurately locates and supports outer race 46' for rotation relative to housing 62'. A snap ring 184 axially locates bearing assembly 182 on housing 62'. Clutch 10' includes a cage 186 having a radially inwardly extending flange 188. Cage 186 includes a circumferential groove 190. A similar opposing circumferential groove 192 is formed on outer race 46'. One or more ball bearings 194 are positioned within grooves 190, 192 to guide cage 186 relative to outer race 46' and reduce the friction therebetween during relative rotation. It should be appreciated that during the open or free-wheeling mode of operation, no frictional losses occur between rollers 50', inner race 48', outer race 46' and cage 186.

Figure 11:
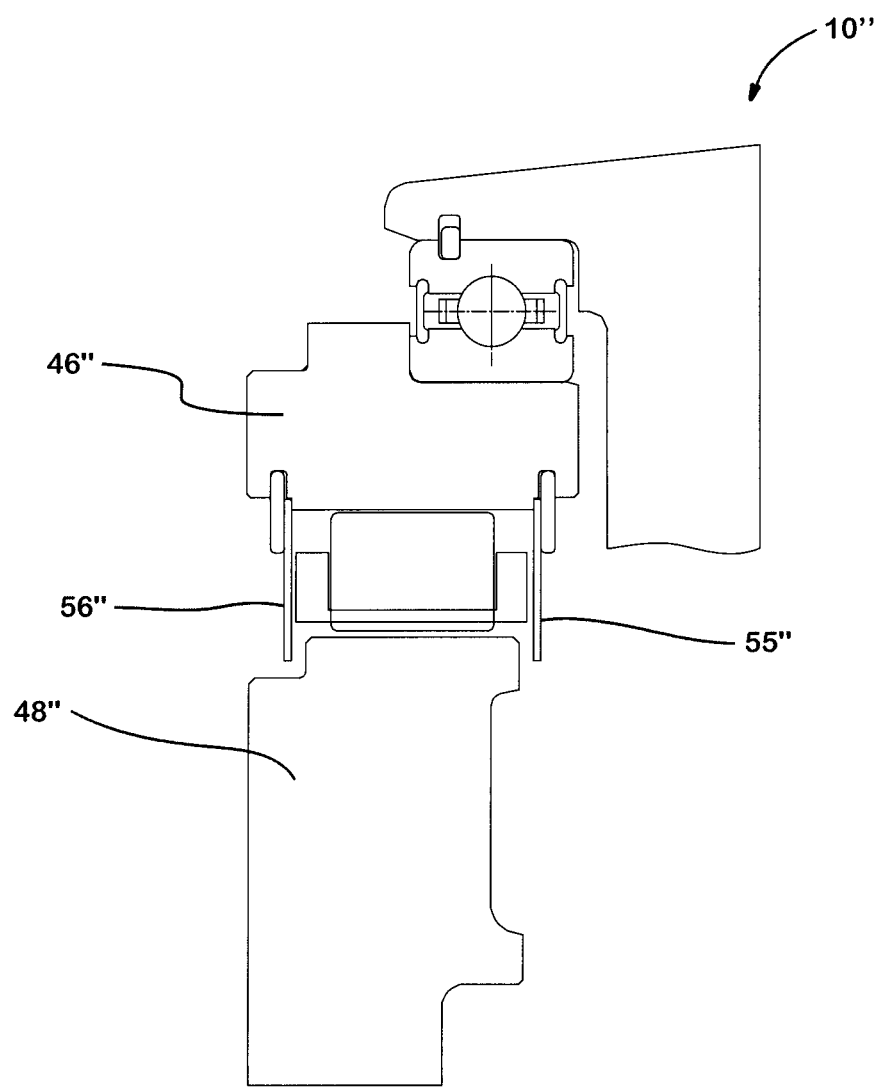
FIG. 11 is a fragmentary cross-sectional view depicting a portion of an alternate one-way clutch.

FIG. 11 depicts another alternate clutch 10". Clutch 10" is substantially similar to clutch 10 except that a lubricant is not trapped between inner race 48" and outer race 46" through the use of seal plates similar to those previously described. On the contrary, relatively large air gaps exist between seal plates 55", 56" and inner race 48". This arrangement assures a very low resistance to relative rotation between inner race 48" and outer race 46" is present during the free-wheeling mode of operation.

Figure 12:
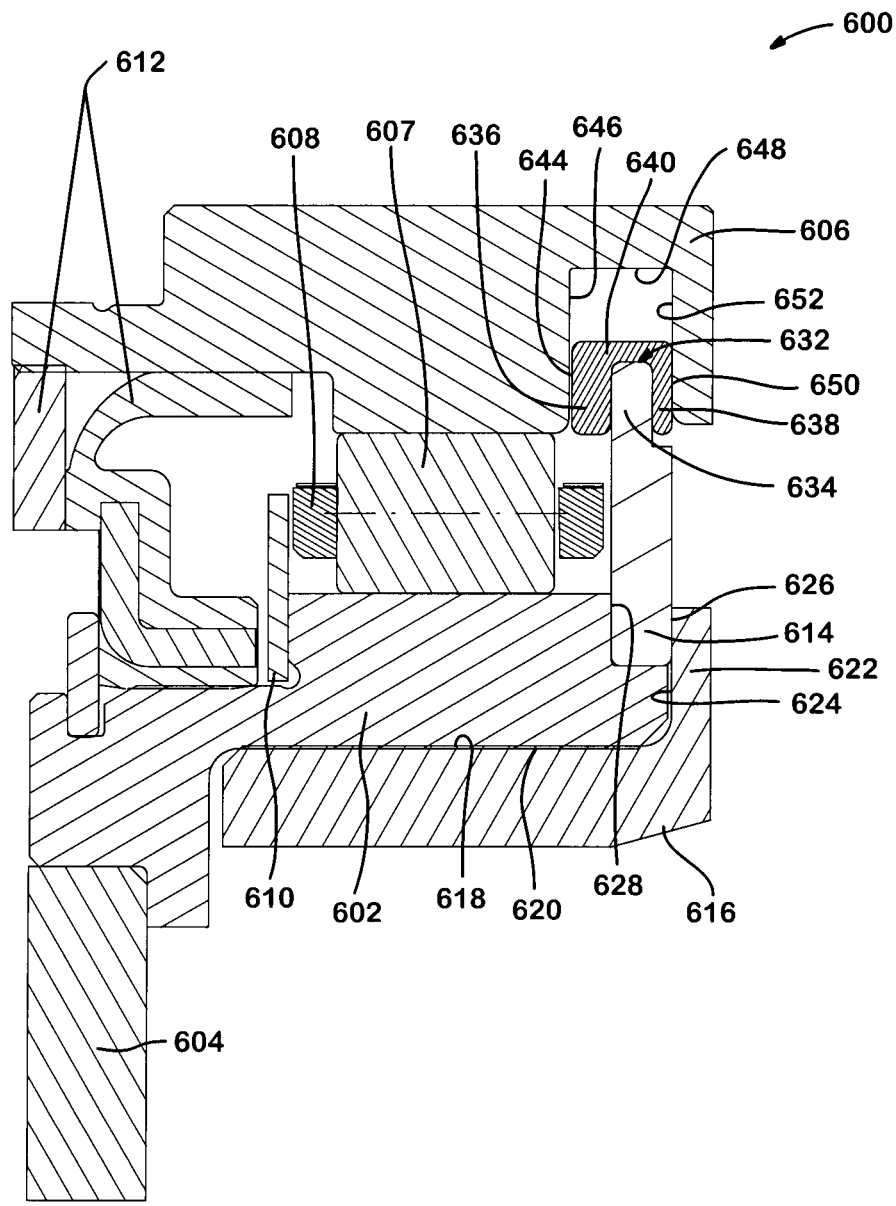
FIG. 12 is a fragmentary cross-sectional view of an alternate clutch equipped with a cap and a shoe.

FIG. 12 depicts another clutch identified at reference numeral 600. Clutch 600 includes an outer race 602 fixed for rotation with a drive plate 604, an inner race 606, rollers 607, a cage 608, a cage retainer plate 610, a seal 612 and an ID-OD clip 614. Clutch 600 also includes a cap 616 that is coupled to outer race 602 via a shrink fit process. Accordingly, an inner cylindrical surface 618 of cap 616 applies a compressive force to an outer cylindrical surface 620 of outer race 602. The compressive force offsets a hoop stress occurring in outer race 602 when clutch 600 is locked.

Furthermore, cap 616 includes a radially inwardly extending flange 622 having a substantially planar inner face 624. Planar face 624 engages a face 626 of ID-OD clip 614. ID-OD clip 614 is trapped between flange 622 and a land 628 formed on outer race 602. Cap 616 functions to lock ID-OD clip 614 to outer race 602. ID-OD clip 614 is restricted from rotation relative to outer race 602 during clutch operation.

Clutch 600 also includes a shoe 632 fixed to an inner diameter portion 634 of ID-OD clip 614. Shoe 632 includes a "C"-shaped cross section having a first leg 636 and a second leg 638 interconnected by an end wall 640. Shoe 632 may be formed from bronze, a polymer or some other friction reducing guide material. Shoe 632 may be fixed to ID-OD clip 614 by a number of methods including mechanical fasteners such as rivets or via an adhesive. Alternatively, shoe 632 may be overmolded to ID-OD clip 614. In yet another version, shoe 632 may be formed from two pieces where the shoe is fixed with a mechanical lock that may separate under load conditions. First leg 636 includes a guide surface 644 spaced apart from a side wall 646 of a groove 648 formed in inner race 606. Similarly, second leg 638 includes a guide face 650 spaced apart from an opposite side wall 652 of groove 648.

Figure 13:
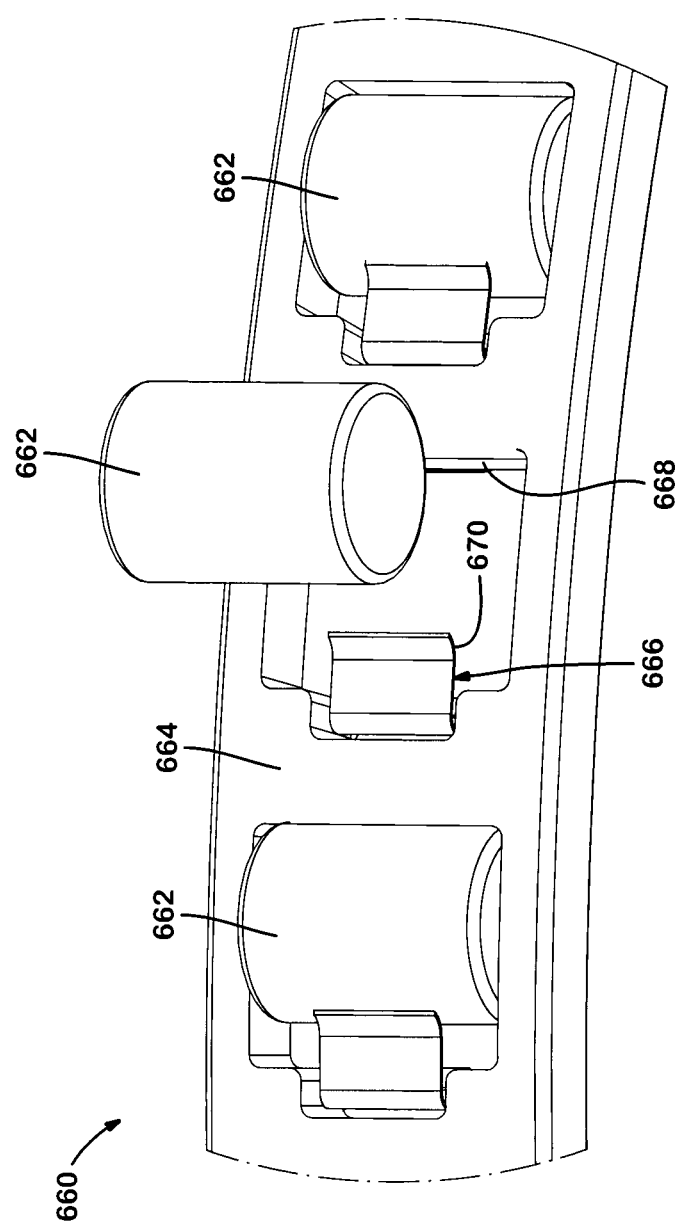
FIG. 13 is a fragmentary perspective view of an alternate cage and roller subassembly.
Figure 14:
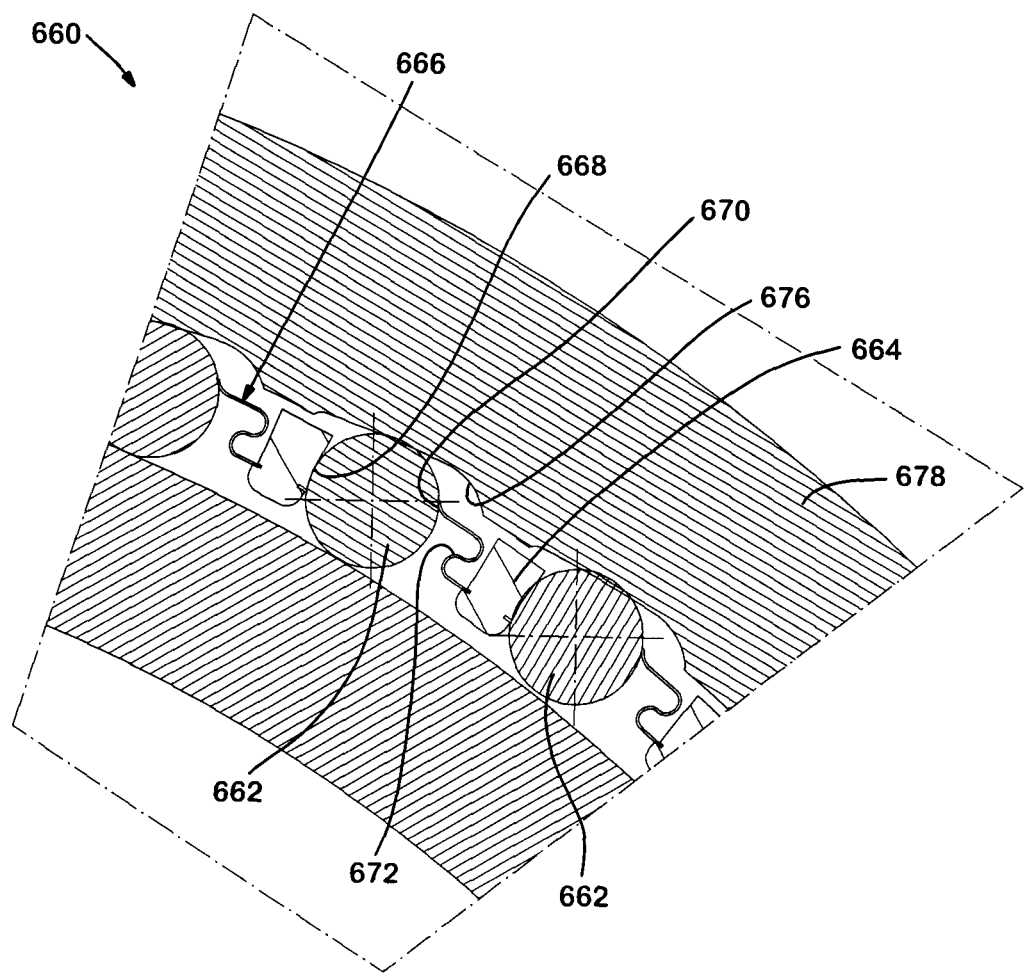
FIG. 14 is a fragmentary sectional view of the cage and roller assembly shown in FIG. 13.

FIGS. 13 and 14 depict an alternate roller and cage subassembly 660 including rollers 662, a cage 664 and a multi-spring 666. Each roller 662 is trapped between a concave surface 668 formed on cage 664 and a convexedly-shaped distal end 670 of multi-spring 666. A body portion 672 of multi-spring 666 includes a serpentine shape thereby allowing distal end 670 to deflect during clutch operation. Distal end 670 biases roller 662 toward concave surface 668. Roller 662 is positioned in a groove 676 formed in an outer race 678.

Figure 15:
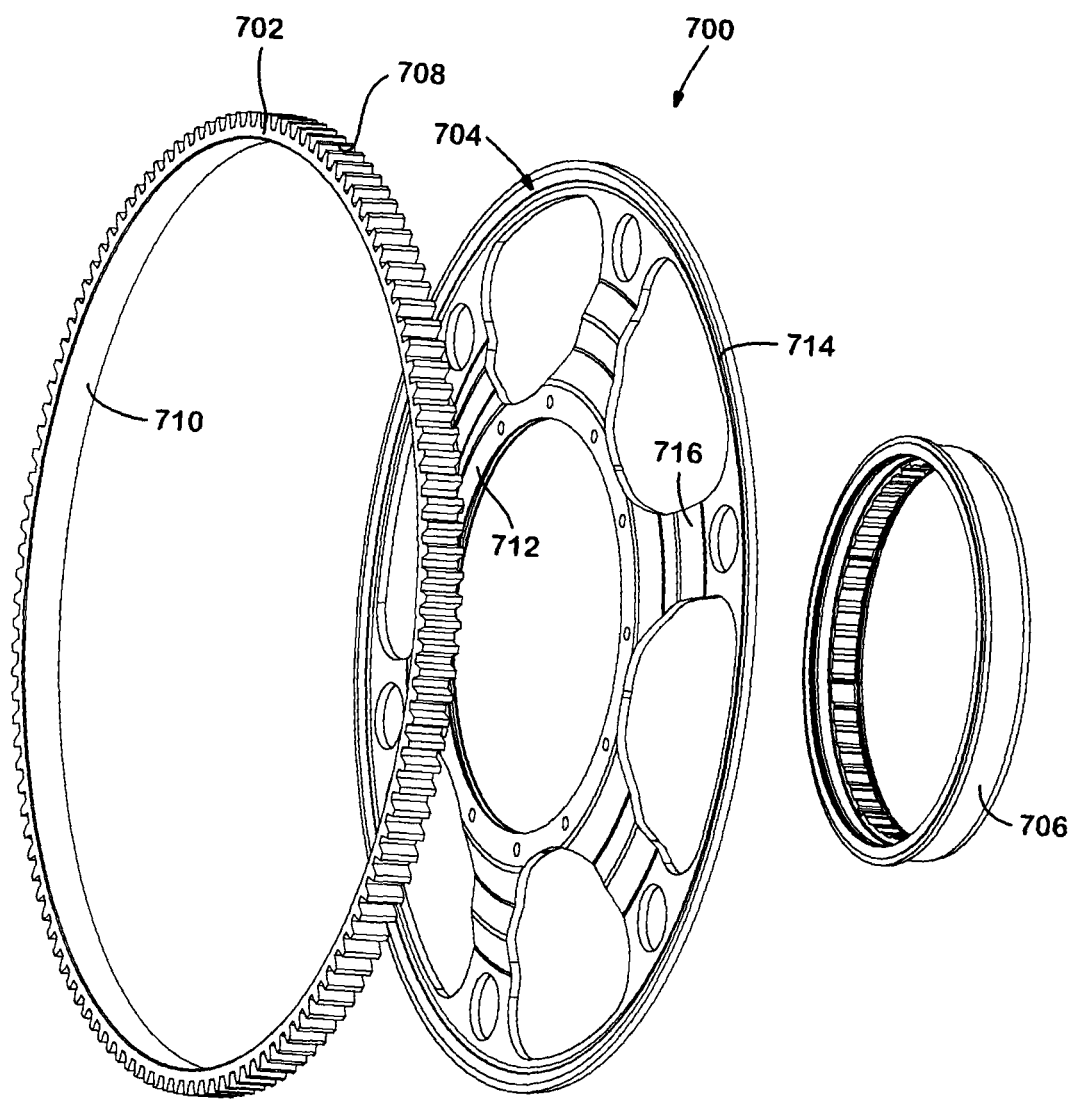
FIG. 15 is an exploded perspective view of an alternate drive plate assembly.

FIG. 15 depicts an alternate drive plate 700 including a gear 702, a hub 704 and an outer race 706. Gear 702 is preferably constructed from a metal such as hardenable steel and includes a plurality of external teeth 708, as well as a substantially inner cylindrical surface 710. Hub 704 includes an inner ring 712, an outer ring 714 and a plurality of radially extending spokes 716 interconnecting outer ring 714 and inner ring 712. Hub 704 is preferably constructed from a lightweight material such as a polymer. Outer race 706 is preferably constructed from a metal such as a hardenable steel and is substantially similar to the outer races previously described. Drive plate 700 may be constructed using a overmolding process where outer race 706 and gear 702 are placed within an injection mold cavity. Molten resin is injected into the mold cavity to define hub 704 while simultaneously fixing outer ring 714 to gear 702 as well as fixing inner ring 712 to outer race 706. The relatively low weight and low cost drive plate 700 may be used in conjunction with any of the clutches previously described.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A one-way clutch assembly comprising:
   an inner race adapted to be fixed for rotation with a first rotatable member;
   an outer race having circumferentially spaced apart cam surfaces and being adapted to be fixed for rotation with a second rotatable member;
   a plurality of roller elements positioned radially between the inner and outer races;
   a cage being moveable relative to the outer race and including a plurality of radially extending arms;
   a plurality of circumferentially extending roller springs each cooperating with one of the radially extending arms of the cage about a first spring end and extending from the first spring end to a second spring end to align each roller element with the cam surfaces and urge the roller elements away from the inner race;

a first seal plate coupled to one of the inner and outer races and extending over a first end of the roller elements terminating within a recess formed in the other of the inner and outer races and disposed in close proximity to but spaced apart from the other of the inner and outer races;

a second seal plate coupled to said one of the inner and outer races and extending over a second opposite end of the roller elements terminating within another recess formed in said other of the inner and outer races and disposed in close proximity to but spaced apart from said other of the inner and outer races;

a lubricant retained in contact with the roller elements by the first and second seal plates; and each of said plurality of circumferentially extending roller springs including a guide disposed at the second spring end and having a pair of bifurcated legs disposed in saddling relationship with one of the roller elements to establish the aligned relationship of each roller element with the cam surfaces.

2. The one-way clutch assembly of claim 1 further including snap rings engaging each of the seal plates to couple the seal plates to one of the inner and outer races.

3. The one-way clutch assembly of claim 2 further including a bushing adapted to be fixed to a housing, the bushing rotatably supporting the outer race.

4. The one-way clutch assembly of claim 3 further including a retaining ring positioned within a ring groove formed on an outer surface of the outer race to restrict movement of the clutch relative to the housing.

5. The one-way clutch assembly of claim 2 further including a bearing adapted to be fixed to a housing, the bearing rotatably supporting the outer race.

6. The one-way clutch assembly of claim 1 wherein the cage includes first and second spaced apart rings interconnected by axially extending webs.

7. The one-way clutch assembly of claim 1 further including an accordion spring acting on the cage to space apart the roller elements from the inner race and place the clutch assembly in a free-wheeling mode.

8. The one-way clutch assembly of claim 7 wherein the accordion spring is coupled to one of the radially extending arms, the accordion spring and the arm being positioned within a recess formed in the outer race.

9. The one-way clutch assembly of claim 8 wherein the accordion spring is compressed and the arm is disengaged from the outer race when the roller elements engage with the cam surfaces and the inner race to place the clutch assembly in a torque transferring mode.

10. The one-way clutch assembly of claim 8 wherein the arm engages the outer race and the cage positions the roller elements in a deep portion of the cam surfaces when the clutch assembly is in the free-wheeling mode.

11. A one-way clutch assembly comprising:
an inner race adapted to be fixed for rotation with a first rotatable member;
an outer race having circumferentially spaced apart cam surfaces and being adapted to be fixed for rotation with a second rotatable member;
a plurality of roller elements positioned radially between the inner and outer races;
a cage being moveable relative to the outer race and including a plurality of radially extending arms;
a plurality of circumferentially extending springs each cooperating with one of the radially extending arms of the cage about a first spring end and extending from the first spring end to a second spring end to align each roller element with the cam surfaces, the springs and cage urging the roller elements away from the inner race;
a retaining mechanism coupled to one of the inner and outer races and disposed in close proximity to but spaced apart from the other of the inner and outer races to capture lubricant in contact with the roller elements; and
each of said plurality of circumferentially extending roller springs including a guide disposed at the second spring end and having a pair of bifurcated legs disposed in saddling relationship with one of the roller elements to establish the aligned relationship of each roller element with the cam surfaces.

12. The one-way clutch assembly of claim 11 wherein the retaining mechanism includes a first seal plate coupled to one of the inner and outer races and extending over a first end of the roller elements terminating within a recess formed in the other of the inner and outer races and a second seal plate coupled to one of the inner and outer races and extending over a second opposite end of the roller elements terminating within another recess formed in the other of the inner and outer races.

13. The one-way clutch assembly of claim 12 further including snap rings engaging each of the seal plates to couple the seal plates to one of the inner and outer races.

14. The one-way clutch assembly of claim 11 further including an accordion spring acting on the cage to space apart the roller elements from the inner race and place the clutch assembly in a free-wheeling mode.

15. The one-way clutch assembly of claim 14 wherein the accordion spring is coupled to one of the radially extending arms, the accordion spring and the arm being positioned within a recess formed in the outer race.

16. The one-way clutch assembly of claim 15 wherein the accordion spring is compressed and the arm is disengaged from the outer race when the roller elements engage with the cam surfaces and the inner race to place the clutch assembly in a torque transferring mode.

17. The one-way clutch assembly of claim 11 further including a cap including an inner surface circumscribing and being biasedly engaged with an outer surface of the outer race.

18. The one-way clutch assembly of claim 17 wherein the cap is fixed to the outer race in a shrink fit.

19. The one-way clutch assembly of claim 17 wherein the cap includes a flange engaging the retaining mechanism to restrict relative rotation between the outer race and the retaining mechanism.

20. The one-way clutch assembly of claim 11 further including a polymeric hub overmolded to the outer race and an externally toothed ring gear.

21. A one-way clutch assembly comprising:
an inner race adapted to be fixed for rotation with a first rotatable member;
an outer race having circumferentially spaced apart cam surfaces and being adapted to be fixed for rotation with a second rotatable member;
a plurality of roller elements positioned radially between the inner and outer races;
a cage aligning each roller element with the cam surfaces and including a plurality of radially extending arms;
a spring acting on the cage to space apart the roller elements from the inner race and place the clutch in a free-wheeling model;
a first seal plate coupled to one of the inner and outer races and extending over a first end of the roller elements terminating within a recess formed in the other of the inner and outer races and disposed in close proximity to but spaced apart from the other of the inner and outer races;

a second seal plate coupled to said one of the inner and outer races and extending over a second opposite end of the roller elements terminating within another recess formed in said other of the inner and outer races and disposed in close proximity to but spaced apart from said other of the inner and outer races;

a lubricant retained in contact with the roller elements by the first and second seal plates; and a plurality of circumferentially extending roller springs each cooperating with one of the radially extending arms of the cage about a first spring end and each including a guide having a pair of bifurcated legs disposed in saddling relationship with one of the roller elements about a second spring end to establish aligned relationship of each roller element with the cam surfaces.

\* \* \* \* \*